United States Patent
Lee et al.

(10) Patent No.: US 8,582,750 B2
(45) Date of Patent: Nov. 12, 2013

(54) CONNECTION RECOVERY IN A CALL CENTER

(75) Inventors: Eric H. Lee, San Jose, CA (US); Fadi R. Jabbour, Sunnyvale, CA (US); David C. Lee, Sunnyvale, CA (US); Johnny H. Lee, San Gabriel, CA (US)

(73) Assignee: Cisco Technology, Inc., San Jose, CA (US)

( * ) Notice: Subject to any disclaimer, the term of this patent is extended or adjusted under 35 U.S.C. 154(b) by 2235 days.

(21) Appl. No.: 11/461,114

(22) Filed: Jul. 31, 2006

(65) Prior Publication Data

US 2008/0037764 A1 Feb. 14, 2008

(51) Int. Cl.
*H04M 3/00* (2006.01)
*G06F 15/16* (2006.01)

(52) U.S. Cl.
USPC ...................................... 379/265.02; 709/227

(58) Field of Classification Search
USPC ............. 379/355.02, 265.02, 265.12, 265.01, 379/265.09, 201, 202, 203, 204, 210, 221, 379/265, 266, 260, 261, 258, 309, 201.01, 379/88.18; 455/519, 403, 423, 424, 436; 370/352, 353, 354, 355, 356, 357
See application file for complete search history.

(56) References Cited

U.S. PATENT DOCUMENTS

| | | | | |
|---|---|---|---|---|
| 5,592,538 A * | 1/1997 | Kosowsky et al. | ......... | 379/93.08 |
| 5,815,566 A * | 9/1998 | Ramot et al. | ............. | 379/210.01 |
| 5,940,480 A * | 8/1999 | Jeon et al. | ................ | 379/112.03 |
| 5,995,830 A * | 11/1999 | Amin et al. | ................... | 455/423 |
| 6,249,570 B1 * | 6/2001 | Glowny et al. | ............ | 379/88.22 |
| 6,345,094 B1 * | 2/2002 | Khan et al. | ............... | 379/266.07 |
| 6,404,747 B1 * | 6/2002 | Berry et al. | ..................... | 370/270 |
| 6,449,356 B1 * | 9/2002 | Dezonno | .................. | 379/265.01 |
| 6,522,742 B1 * | 2/2003 | Crosby et al. | ................. | 379/219 |
| 6,771,765 B1 * | 8/2004 | Crowther et al. | ........ | 379/265.09 |
| 6,819,759 B1 * | 11/2004 | Khuc et al. | .................... | 379/309 |
| 6,826,194 B1 * | 11/2004 | Vered et al. | .................... | 370/449 |
| 7,308,093 B2 * | 12/2007 | Annadata et al. | ........ | 379/265.12 |
| 7,426,268 B2 * | 9/2008 | Walker et al. | ............ | 379/266.01 |
| 7,505,577 B2 * | 3/2009 | Annadata et al. | ........ | 379/265.09 |
| 7,581,230 B2 * | 8/2009 | Chen et al. | ..................... | 719/328 |
| 2002/0106070 A1 * | 8/2002 | Elsey et al. | ............... | 379/218.01 |
| 2003/0048884 A1 * | 3/2003 | Mateu | ........................ | 379/88.22 |
| 2004/0013255 A1 * | 1/2004 | Williams et al. | ......... | 379/207.02 |
| 2004/0032862 A1 * | 2/2004 | Schoeneberger et al. | ..... | 370/352 |
| 2004/0057569 A1 * | 3/2004 | Busey et al. | ............. | 379/265.09 |
| 2004/0151508 A1 * | 8/2004 | Ishizuka | ........................ | 398/141 |
| 2004/0193475 A1 * | 9/2004 | Hemm et al. | ..................... | 705/9 |
| 2004/0208307 A1 * | 10/2004 | Walker et al. | ............ | 379/265.01 |
| 2004/0230417 A1 * | 11/2004 | Kraiss et al. | ...................... | 704/8 |
| 2004/0235509 A1 * | 11/2004 | Burritt et al. | .................... | 455/519 |
| 2005/0182672 A1 * | 8/2005 | Hemm et al. | ..................... | 705/9 |
| 2005/0232409 A1 * | 10/2005 | Fain et al. | ............... | 379/265.02 |
| 2005/0238144 A1 * | 10/2005 | Flathers et al. | ................. | 379/52 |
| 2006/0153064 A1 * | 7/2006 | Caballero-McCann et al. | ............................. | 370/216 |

(Continued)

*Primary Examiner* — Fan Tsang
*Assistant Examiner* — Kharye Pope
(74) *Attorney, Agent, or Firm* — P. Su

(57) ABSTRACT

In one embodiment, a method includes detecting termination of a first connection between a first caller and a first agent during a communication session between the first caller and the first agent. The method also includes storing information indicating a state of the communication session at the termination of the first connection, and communicating the information to the first agent or to a second agent in response to establishment of a second connection between the first caller and the first agent or the second agent to facilitate a continuation of the communication session.

23 Claims, 12 Drawing Sheets

(56) References Cited

U.S. PATENT DOCUMENTS

| | | | |
|---|---|---|---|
| 2006/0203988 A1* | 9/2006 | Rodriguez et al. | 379/265.01 |
| 2006/0210025 A1* | 9/2006 | Dhanakshirur | 379/88.04 |
| 2006/0251233 A1* | 11/2006 | Mott | 379/203.01 |
| 2006/0262921 A1* | 11/2006 | Eppel et al. | 379/265.02 |
| 2007/0192414 A1* | 8/2007 | Chen et al. | 709/205 |
| 2007/0192415 A1* | 8/2007 | Pak | 709/206 |
| 2007/0203797 A1* | 8/2007 | Annadata et al. | 705/26 |
| 2007/0208858 A1* | 9/2007 | Ra et al. | 709/227 |

\* cited by examiner

CONNECTION RECOVERY IN A CALL CENTER

BACKGROUND OF THE INVENTION

Many organizations use call centers to provide service to callers, e.g., customers or clients. When a caller calls into, or otherwise accesses, a call center via a device such as a telephone, the caller is typically put into contact with a service agent. The caller and the service agent may interact during a call to reach a resolution to a problem or an issue that is a concern to the customer. During the call, the caller may explain in great detail the problem that he or she would like to resolve. When a resolution is reached between the caller and the agent, a work entry that is associated with the resolution may be stored within the call center, and the call may be ended. A call between a caller and an agent may be ended prematurely, as for example before a resolution is reached. The premature end of a call may be a result of different fault conditions including, but not limited to, network failures, telephone failures, and overall system failures. Fault conditions or failures may occur on either side of a call connection, e.g., a fault condition may be associated on a caller side or on a call center side.

BRIEF DESCRIPTION OF THE DRAWINGS

The invention may best be understood by reference to the following description taken in conjunction with the accompanying drawings in which.

DESCRIPTION OF EXAMPLE EMBODIMENTS

When a caller contacts a call center, the caller generally has an issue that he or she wishes to resolve. Once the caller is in communication with a server agent of the call center, the caller may describe the issue at hand. If a failure occurs such that the communication between the caller and the server agent is unexpectedly terminated, the caller is unlikely to re-establish communication with the same server agent to which the caller was describing the issue. As a result, to achieve resolution, the caller may be forced to describe the issue to another server agent, even though he or she has previously described the issue.

In one embodiment, if a caller or a client who has been unexpectedly disconnected from a server agent of a call center places another call to the call center relatively soon after the unexpected disconnection, the caller may be provided with priority service. By way of example, the caller may be reconnected to the same agent that he or she was previously connected to such that a previous discussion may effectively continue. As the agent already has some familiarity with the issues concerning the caller, the caller may be spared from repeating information conveyed during a previous call. If the agent is unavailable, the caller may be placed at the beginning of a queue group for service.

By storing run-time state information of a call, when a caller and an agent are prematurely disconnected, information that identifies the caller and the agent as being associated with the call is maintained in a call center. As such, when the caller calls back into the call center, the stored run-time state information may be used to identify the agent such that the caller may be reconnected to the agent.

Figure 1A:
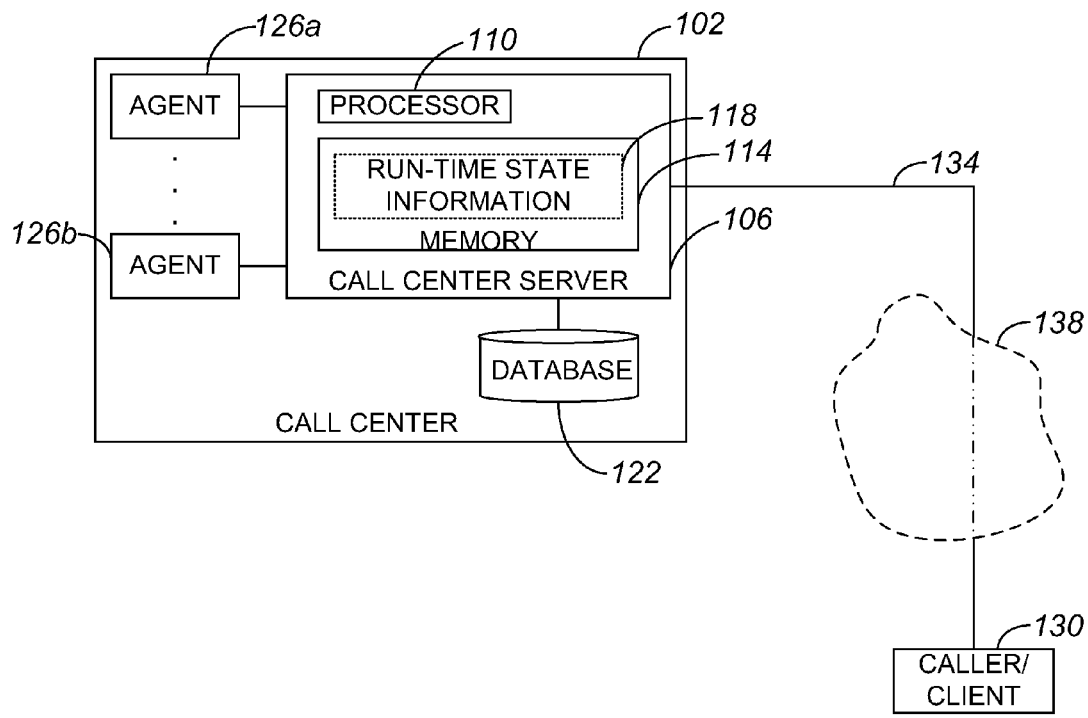
FIG. 1A is a block diagram representation of a system in which a caller may call into a call center in accordance with an embodiment of the present invention.

FIG. 1A is a block diagram representation of a system in which a caller may call into a call center in accordance with an embodiment of the present invention. A caller or a client 130, may access a call center 102 to request service on a connection 134. Connection 134 may be substantially any communications link, e.g., a wired or a wireless communications link. Connection 134 may, in one embodiment, pass through a network 138 that includes a router that forwards packets.

Call center 102 includes a call center server 106 and a database 122. Database 122 is arranged to store data, as for example work entry data, that pertains to previously resolved calls into call center 102. Call center server 106 is arranged to receive a call from caller 130 on connection 134. A processor 110 of call center server 106 facilitates a communication between caller 130 and one of server agents 126a, 126b. In general, call center 102 may include any number of agents 126a, 126b, or entities which provide service to caller 130.

Call center server 106 stores run-time state information 118 from caller 130 and an agent 126a, 126b to which caller 130 is connected. Run-time state information 118 is generally stored into a memory 114, although it should be appreciated that run-time state information 118 may instead be stored in database 122. If caller 130 is connected to agent 126a, then run-time state information 118 may include, but is not limited to including, a phone number or other identifying information for caller 130, and identifying information for agent 126a. Generally, caller 130 may effectively enter a phone number or identifying information by typing the information in when prompted by call center 102, or speaking the information when prompted. In one embodiment, when call center 102 is associated with an enterprise deployment, a phone number of caller 130 may substantially be automatically obtained. Other identifying information such as a serial number of a product for which service is desired or the type of service that is requested may also, or instead, be provided by caller 130 and stored as run-time state information 118.

Figure 1B:
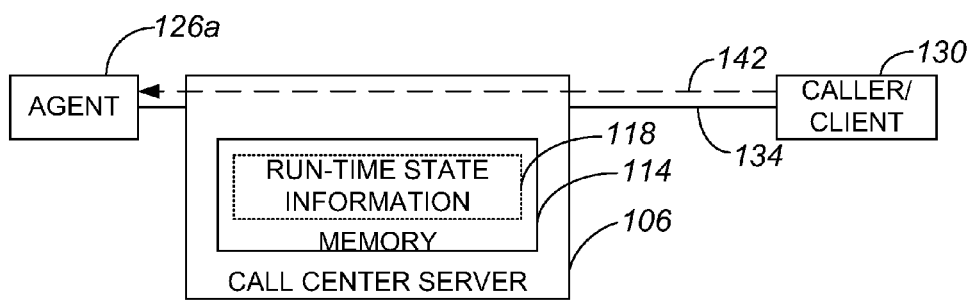
FIG. 1B is a diagrammatic representation of a caller regaining access to an agent, e.g., caller 130 of FIG. 1A regaining access to agent 126a of FIG. 1A, after a connection to the agent is lost in accordance with an embodiment of the present invention.

While caller 130 and agent 126a are connected, caller 130 may describe an issue or a request to agent 126a. Agent 126a typically locally logs information pertaining to the issue or the request, and when resolution is reached, agent 126a may publish or otherwise store a work entry (not shown) in database 122. If a connection between caller 130 and agent 126a is lost prior to reaching a resolution, call center server 106 is arranged to use run-time state information 118 to reconnect caller 130 to agent 126a when possible. As shown in FIG. 1B, if a connection between caller 130 and agent 126a is lost, a new connection 142 may be established by call center server 106. In one embodiment, call center server 106 identifies an association between caller 130 and agent 126a using run-time state information 118, and proceeds to establish connection 142 when both caller 130 and agent 126a are available.

The storage of run-time state information 118, or state information associated with caller 130 and agent 126a, provides information that may be used to reconnect caller 130 and agent 126a in the event that caller 130 and agent 126a are disconnected prior to resolving issues discussed during a call. Reconnecting caller 130 and agent 126a allows information already logged by agent 126a that pertains to issues of caller 130 to be available, thereby preventing caller 130 from having to explain his/her issues to another agent, e.g., agent 126b of FIG. 1B, to which caller 130 may be connected after an initial connection is lost.

Figure 2:
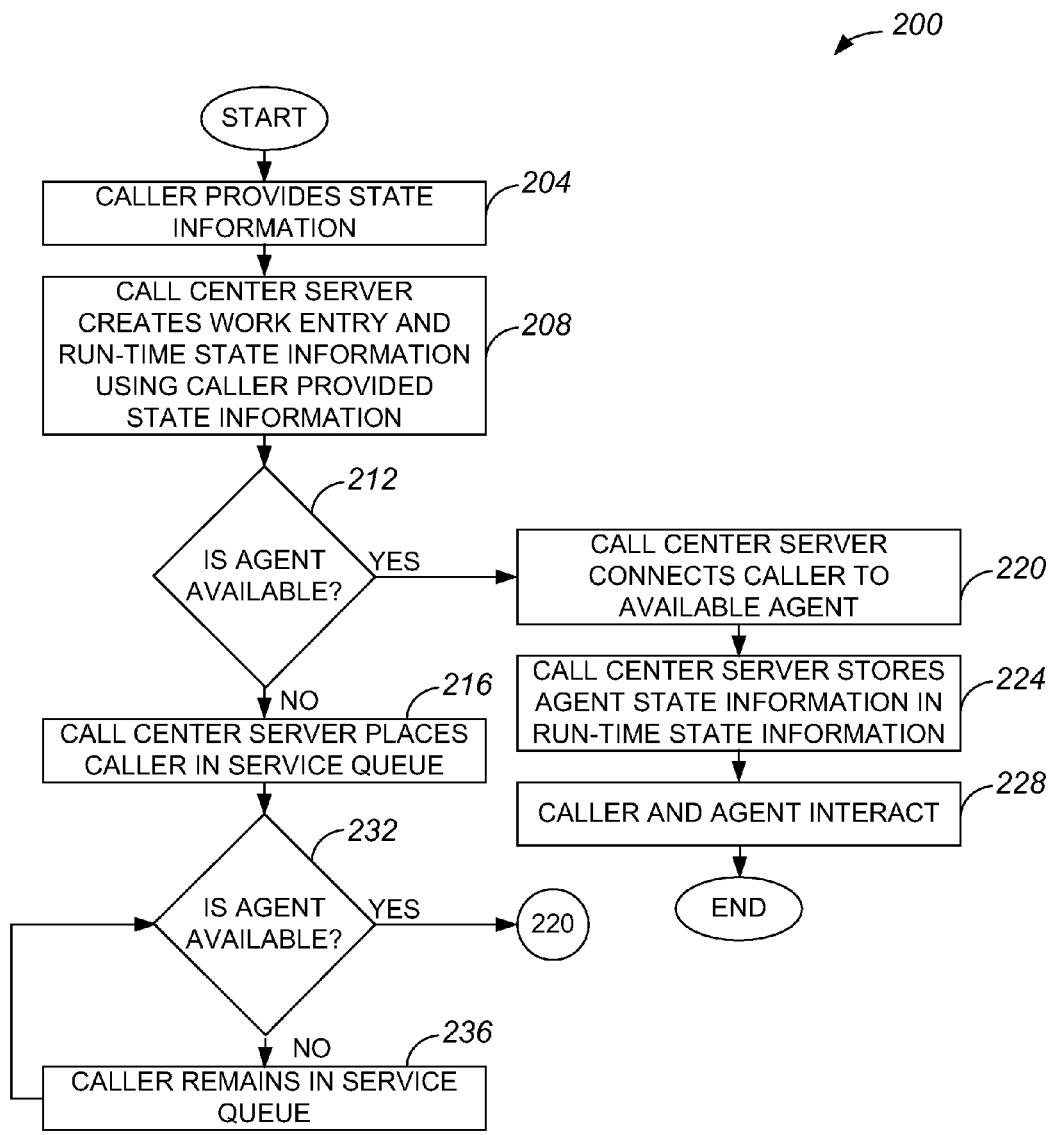
FIG. 2 is a process flow diagram which illustrates a method of establishing a call from a caller in accordance with an embodiment of the present invention.

Run-time state information 118 may be obtained from caller 130 upon caller connecting with call center 102 via connection 134, and from agent 126a after call center server 106 effectively connects caller 130 to agent 126a. FIG. 2 is a process flow diagram which illustrates a method of establishing a call between a caller and an agent in accordance with an embodiment of the present invention. A process 200 of establishing a call begins at step 204 in which a caller provides state information when the caller initiates a call. The state information, as mentioned above, may be provided in a variety of different formats in response to prompting from a call center. After the caller provides state information, the call center server creates a work entry and run-time state information in step 208 using the state information provided by the caller. The run-time state information may be stored into a memory of the call center server.

A determination is made in step 212 as to whether an agent is available to accept the call from the caller. If the determination is that there is an available agent that may provide service to the caller, the call center server connects the caller to the available agent in step 220. While substantially any type of connection may be made between the caller and the agent, the call center server may facilitate a point-to-point connection between the caller and the agent. Once the caller is connected to the agent, the call center server obtains and stores state information associated with the agent in step 224 into run-time state information, e.g., the run-time state information created in step 208. It should be appreciated that instead of storing the run-time state information when it is obtained, the run-time state information may instead be obtained without being stored at substantially the same time. The call center server may also provide the work entry created in step 208 to the agent. After the state information for the agent is stored in the run-time state information, the caller and the agent interact in step 228. Interaction between the caller and the agent may include a discussion of issues with which the caller is concerned, and may involve the agent logging information associated with the issues. The process of establishing a call is completed when the caller and the agent interact.

Returning to step 212, if it is determined that there is no available agent to provide service to the caller, the call center server places the caller in a service queue in step 216. The service queue may be a general queue into which all callers awaiting connection to an agent are placed, or the service queue may be a queue that is associated with a specific agent that is appropriate for the caller, e.g., an agent that deals with a particular type of issue. Once the caller is placed in a service queue, the caller may remain in the service queue until an appropriate agent becomes available. As such, a determination is made in step 232 as to whether an agent is available. If an agent is available, then process flow moves to step 220 in which the call center server connects the caller to the available agent and, hence, removes the caller from the service queue. Alternatively, if an agent is not available, the caller remains in the service queue in step 236, and process flow returns to step 232 in which it is determined if an agent is available.

When a caller and an agent are engaged in a call, once a resolution is reached, the call may be terminated, and a work entry that details the resolution may be stored into a database. However, a call may be terminated prematurely, either by a caller side fault or a call center side fault, prior to any resolution being reached. That is, either endpoint of a call may cause communications between the endpoints to be interrupted. It should be appreciated that an intermediate third party may also be the cause of the premature termination of a call, in which case the fault may be treated as a caller side fault.

Figure 3A:
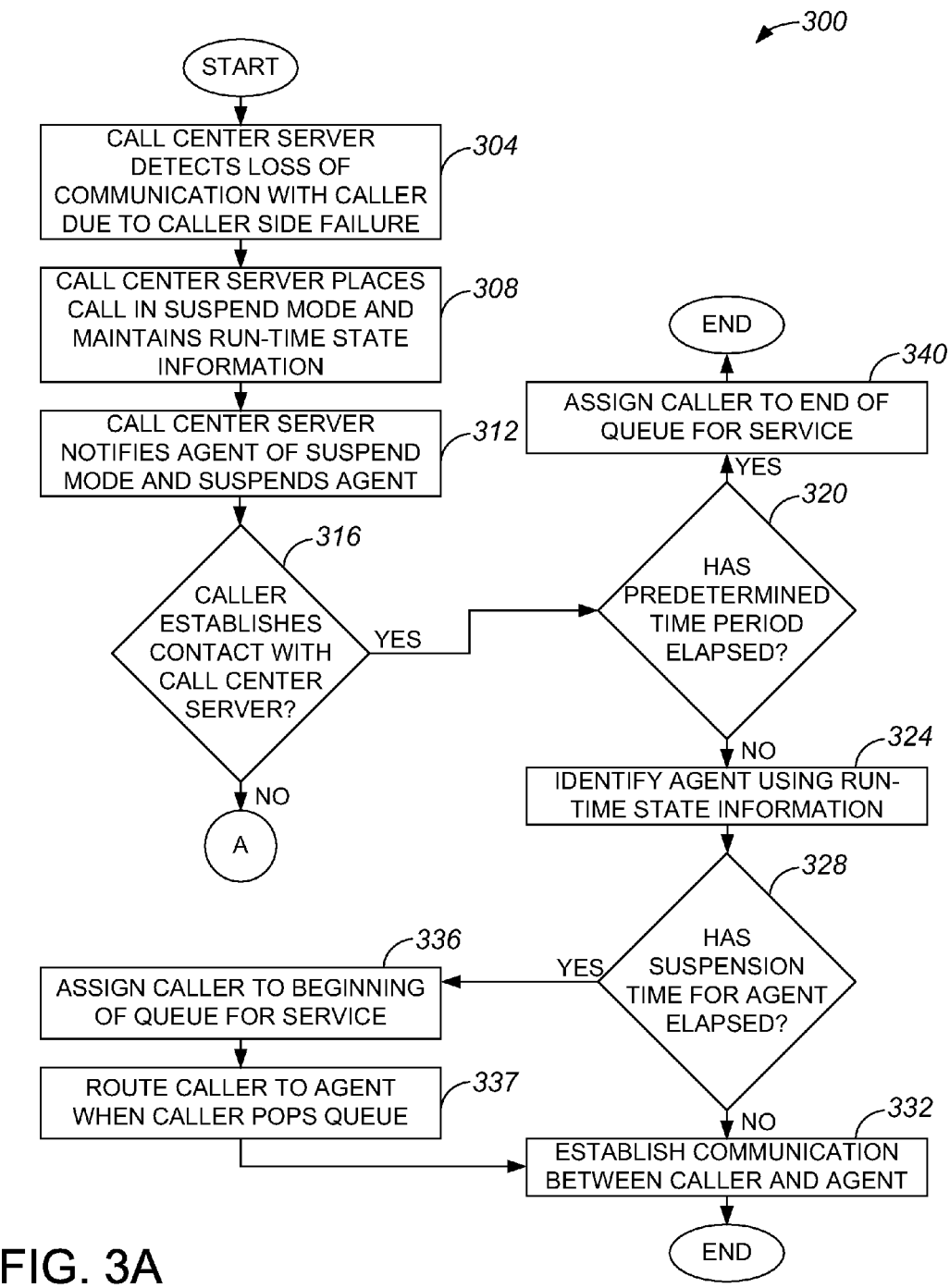
FIGS. 3A and 3B are a process flow diagram which illustrates a method of coping with a lost call connection due to a caller side failure in a system which suspends an agent for a period of time in accordance with an embodiment of the present invention.
Figure 3B:
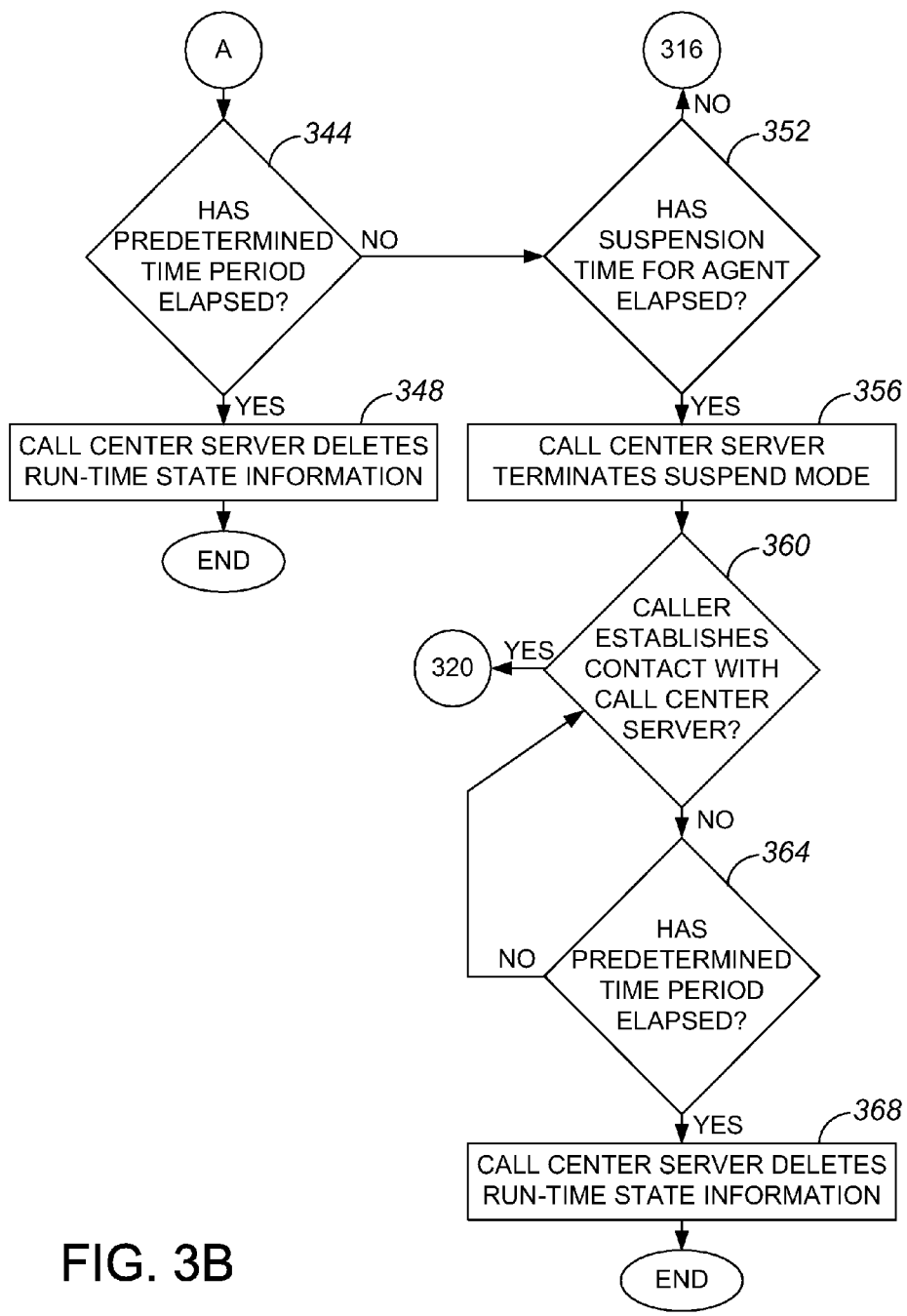

A caller side fault may occur when the network of the caller or a phone of the caller goes down or fails. When a caller side fault is detected by a call center server, the call center server may respond in different manners depending upon whether the agent to which the caller was connected is arranged to be suspended, e.g., is arranged to be substantially inactive while awaiting a possible reconnection to the caller. With reference to FIGS. 3A and 3B, one method of coping with a call connection that is lost due to a caller side failure that involves suspending an agent for a period of time will be described in accordance with an embodiment of the present invention. A process 300 of dealing with a call connection that is lost due to a caller side failure begins at step 304 in which a call center server detects a loss of communication between an agent and a caller during a call due to a caller side failure. When a caller side failure is detected by the agent, for example, the agent may indicate that a caller side failure has been detected, e.g., by manually making a particular sequence of keystrokes using a keyboard. The loss of communication during a call may be identified, for example, by the lack of a stored work entry that is associated with the call.

Once a loss of communication between a caller and an agent during a call is detected, the call is placed in a suspend mode in step 308, and the call center server maintains runtime state information associated with the call. Placing the call in a suspend mode may include generating a record which indicates that the call associated with the run-time state information has been disconnected prematurely Maintaining runtime state information may include storing the run-time state information in a memory of the call center server, or in information associated with a computing system of the agent. In step 312, the call center server provides notification to the agent that the call is in suspend mode, and suspends the agent. Suspending the agent may include preventing the agent from servicing other callers for a particular amount of time, e.g., a suspension time. Suspending the agent may also include placing the agent in a state that indicates that the agent is reserved for the caller. By suspending the agent, the agent will remain substantially available to reconnect to the caller.

After the agent is suspended, it is determined in step 316 whether the caller has established contact with the call center server. That is, a determination is made as to whether the caller has once again accessed the call center server, e.g., after a caller side fault has been corrected. In general, a method of determining whether the caller has one again accessed the call center server may vary. The steps associated with one method of determining whether the caller has established contact with the call center server will be described below with reference to FIG. 3C. If the determination in step 316 is that the caller has established contact with the call center server, process flow moves to step 320 in which it is determined if a predetermined time period has elapsed. A predetermined time period may be a time period within which the caller may reestablish contact with the call server, after a loss of communication, and receive priority service. The predetermined time period may vary widely. In one embodiment, the predetermined time period may be approximately 24 hours after a loss of communication between the caller and the agent.

If it is determined in step 320 that the predetermined time period has elapsed, the indication is that the caller is not to receive priority services. Hence, the caller is assigned to the end of a service queue in step 340, and the process of dealing with a call connection that is lost due to a caller side failure is completed. Alternatively, if it is determined in step 320 that the predetermined time period has not elapsed, the agent is identified using the run-time state information in step 324. Once the agent to which the caller was connected prior to a loss of communication is identified, it is determined whether the suspension time for the agent has elapsed in step 328. Determining whether the agent is still suspended may include checking to determine if the state of the agent is indicated as being reserved for the caller to which the agent was connected prior to the loss of communication, or determining if the agent is tagged as no longer being suspended. While the amount of time the agent may be suspended after the loss of communication with the caller may vary widely, the suspension time is typically less than approximately five minutes. If an assumption is made that the caller is likely to call back as soon as possible, the suspension time may be approximately one or two minutes.

If the determination in step 328 is that the suspension time for the agent has not elapsed, communication between the caller and the agent is established in step 332. Establishing communication between the caller and the agent may include unsuspending the agent, and establishing a point-to-point connection between the caller and the agent. Upon establishing communication between the caller and the agent, the process of dealing with a call connection that is lost due to a caller side failure is completed. Alternatively, if it is determined in step 328 that the suspension time for the agent has elapsed, then the agent may be in communication with a different caller. As such, in step 336, the caller is assigned to the beginning of a service queue. The caller is effectively given priority service, e.g., the caller is placed at the beginning of a service queue rather than at the end of the service queue. The service queue, in one embodiment, is the queue group for the agent and is not a general queue for all callers to a call center.

After the caller is assigned to the beginning of a service queue, the caller is effectively routed to the agent in step 337 when the caller pops the service queue. Then, process flow moves to step 332 in which communication between the caller and the agent is established. In other words, the call between the caller and the agent is recovered. Once the caller is in communication with the agent, the process of dealing with a call connection that is lost due to a caller side failure is completed.

Returning to step 316, if it is determined that the caller has not established contact with the call center server, it is determined if the predetermined time period has elapsed in step 344. Such a determination is generally a determination of whether the time period within which the caller would receive priority service has ended. If it is determined that the predetermined time period has elapsed, then the call center server may delete run-time state information associated with the suspended call in step 344, e.g., the call for which a loss of communication was detected, and the process of dealing with a lost call connection is completed. In one embodiment, in lieu of deleting run-time information when a predetermined period of time has elapsed, the run-time information may instead be deleted whenever storage capacity issues arise.

Alternatively, if it is determined in step 344 that the predetermined time period has not elapsed, it is determined in step 352 whether the suspension time for the agent has elapsed. If the determination is that the suspension time for the agent has not elapsed, process flow returns to step 316 in which it is determined if the caller has established contact with the call center server. On the other hand, if the suspension time for the agent has elapsed, the call center server terminates the suspend mode associated with the agent in step 356. Terminating the suspend mode typically includes allowing the agent to service a different caller in a queue group.

Once the suspend mode for the agent is terminated, it is determined in step 360 whether the caller establishes contact with the call center server. If the caller establishes contact with the call center server, process flow returns to step 320 in which it is determined if the predetermined time period has elapsed. If, however, the caller has not established contact with the call center server, it is determined in step 364 whether the predetermined time period has elapsed, e.g., it is determined if the time period during which the caller would receive priority service has elapsed. When the determination is that the predetermined time period has not elapsed, process flow returns to step 360 in which it is determined if the caller has established contact with the call center server.

Alternatively, if the predetermined time period is determined to be elapsed in step 364, the call center server deletes the run-time state information associated with the call for which the loss of communication between the caller and the agent was detected. After the run-time state information is deleted, or otherwise disposed of, the processing of a lost call connection is completed.

As mentioned above, methods of determining whether a caller has established contact with a call center server after a previous call was prematurely terminated may vary widely.

Figure 3C:
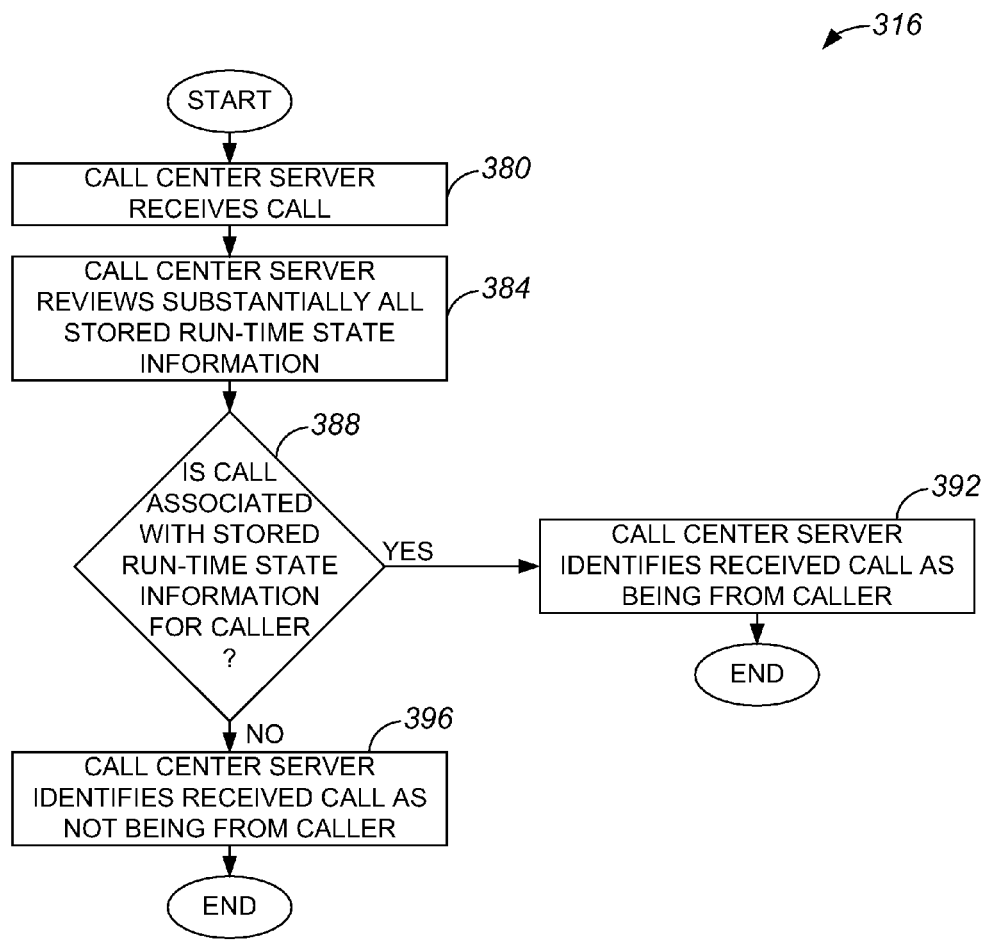
FIG. 3C is a process flow diagram which illustrates one method of determining whether a caller establishes contact with a call center server, e.g., step 316 of FIG. 3A, in accordance with an embodiment of the present invention.

FIG. 3C is a process flow diagram which illustrates one method of determining whether a caller establishes contact with a call center server, e.g., step 316 of FIG. 3A, after a connection was lost in accordance with an embodiment of the present invention. A process 316 of determining whether a received call is from a caller that previously lost contact with an agent begins at step 380 in which a call center server receives a call. Receiving a call may include obtaining state information associated with the initiator of the call, e.g., a phone number. Upon receiving the call, the call center server reviews substantially all stored run-time state information in step 384. It is then determined in step 388 whether the call or, more specifically, the state information associated with the initiator of the call, is associated with stored run-time information for the caller that previously lost contact with an agent. If it is determined that the state information associated with the initiator of the call is not associated with stored run-time state information for the caller, the indication is that the initiator of the call is not the caller that previously lost contact with an agent. Accordingly, in step 396, the call center server identifies the received call is not a call from the caller, and the process of determining whether a call is from a caller that previously lost contact with an agent is completed.

If, however, it is determined in step 388 that state information associated with the initiator of the call is associated with the stored run-time state information for the caller that previously lost contact with an agent, then the indication is that the initiator of the call is the caller that previously lost contact with an agent. As such, in step 392, the call center server identifies the received call as being from the caller that previously lost contact with an agent, and process of determining whether a call is from a caller that previously lost contact with an agent is completed.

Figure 4A:
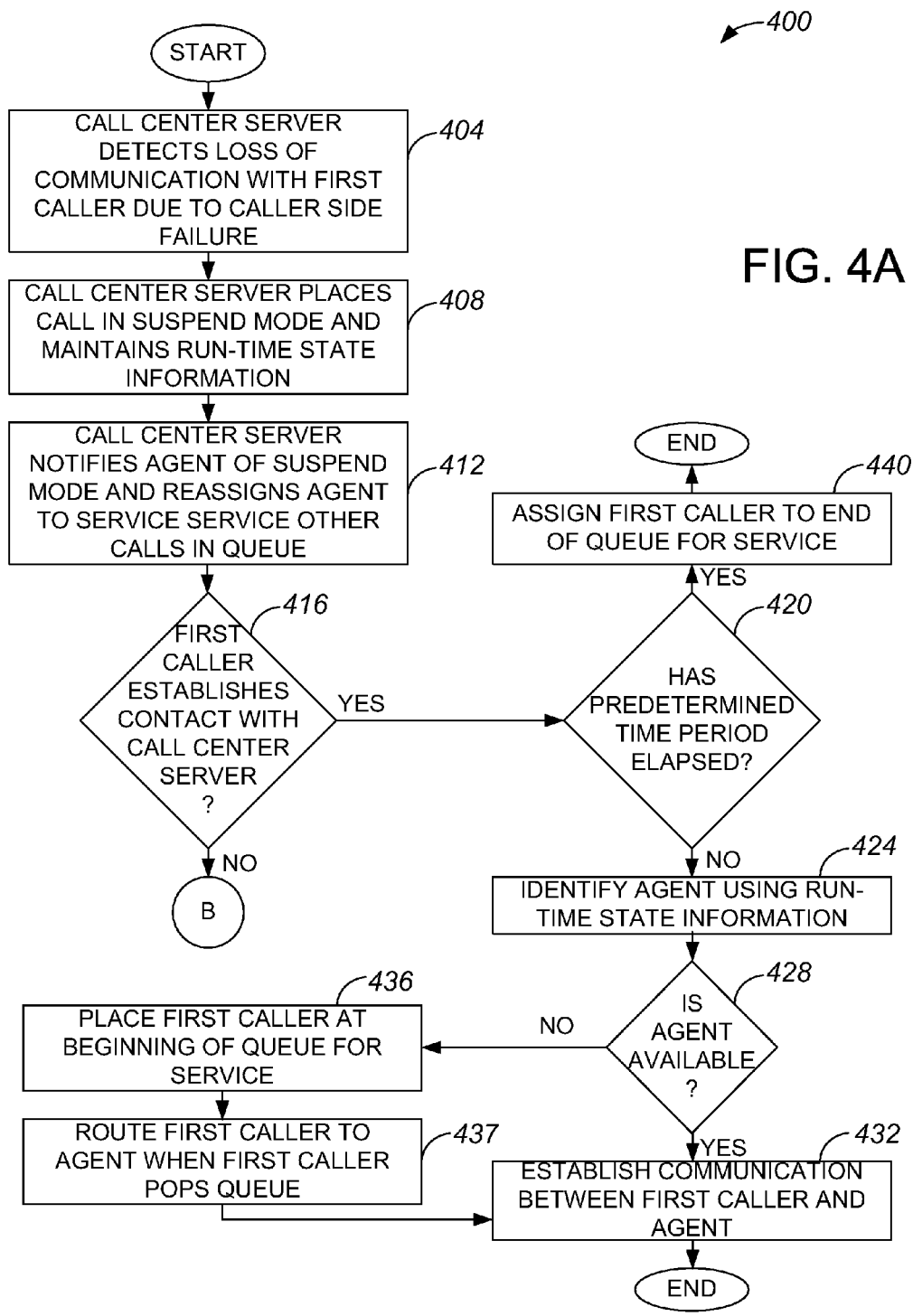
FIGS. 4A and 4B are a process flow diagram which illustrates a method of coping with a lost call connection due to a caller side failure in a system which does not suspend an agent for a period of time in accordance with an embodiment of the present invention.
Figure 4B:
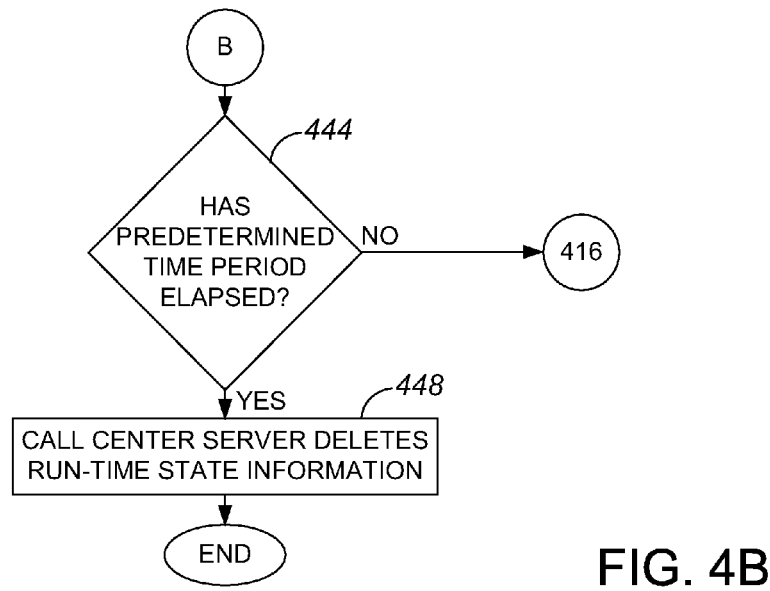

While some call centers may utilize a suspend mode to provide the opportunity for a caller that was previously disconnected from a particular agent to readily reconnect with that particular agent, other call centers may provide priority service to the caller without utilizing a suspend mode. FIGS. 4A and 4B are a process flow diagram which illustrates a method of coping with a lost call connection due to a caller side failure in a system which does not suspend an agent for a period of time in accordance with an embodiment of the present invention. A process 400 of dealing with a call connection that is lost due to a caller side failure begins at step 404 in which a call center server detects a loss of communication with a first caller due to a failure associated with the first caller. The communication is generally detected as lost when a call between the first caller and an agent is effectively dropped.

After a loss of communication is detected, the call center server places the call in a suspend mode in step 408, and maintains run-time state information that was obtained from the first caller and the agent during the course of the call. Then, in step 412, the call center server notifies the agent that the call is in a suspend mode, and reassigns the agent to service other calls in a queue group associated with the agent. In other words, the agent is allowed to connect to other callers waiting in a queue group while the call between the agent and the first caller is in a suspend mode.

A determination is made in step 416 as to whether the first caller has established contact with the call center server. A method such as method 316 of FIG. 3C may be used, in one embodiment, to determine whether the first caller has established contact with the call center server. If the determination is that the first caller has established contact with the call center, it is then determined in step 420 if a predetermined time period, e.g., a period of time in which the call is in suspend mode and the first caller receives priority service, has elapsed or expired. When the predetermined time period is determined to be elapsed, process flow proceeds to step 440 in which the first caller is assigned to the end of a queue for service, and the process of dealing with a lost call connection is completed. The queue to which the caller is assigned may be in the queue group of the agent, in one embodiment.

Alternatively, if it is determined in step 420 that the predetermined time period has not elapsed, the indication is that the first caller is to receive priority service. Accordingly, in step 424, the agent is identified using run-time state information. Such an identification may occur when a call center server identifies run-time state information that associates the first caller with the agent. From step 424, process flow moves to step 428 in which it is determined if the agent is available to be communicate with the first caller. If the determination is that the agent is available, communication between the first caller and the agent is established in step 432, and the process of dealing with a lost call connection is completed.

If, however, the determination in step 428 is that the agent is not available, the implication may be that the agent is either off-line or is in communication with another caller. Hence, in step 436, the first caller is placed at the beginning of a queue for service. In step 437, when the agent becomes available, the first caller is routed to the agent. That is, when the first caller pops the queue, the first caller is routed to the agent. After the caller is routed to the agent, communication is established between the first caller and the agent in step 432.

Returning to step 416, if it is determined that the first caller has not established contact with the call center server, process flow proceeds to step 444 in which it is determined if the predetermined time period has elapsed. If the predetermined time period has not elapsed, process flow returns to step 416 and a determination of whether the first caller has established contact with the call center server. Alternatively, if the determination is that the predetermined time period has elapsed, the indication is that the period within which the first caller would receive priority service has elapsed. As such, the call center server deletes the run-time state information associated with the lost call connection between the first caller and the agent in step 448, and the process of dealing with a lost call connection is completed.

Figure 5A:
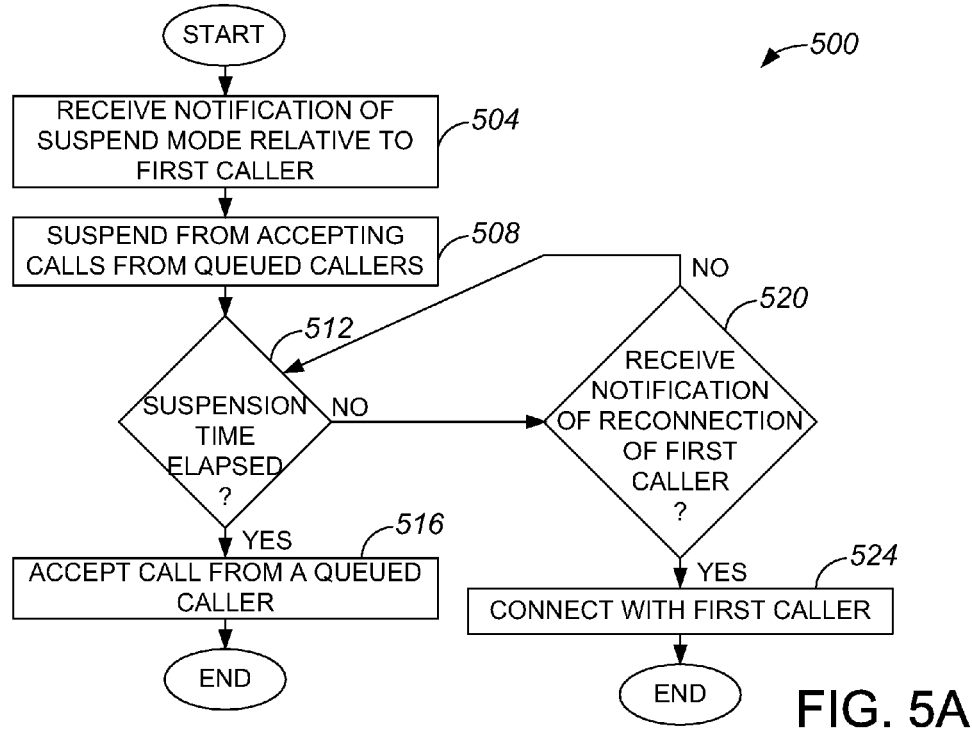
FIG. 5A is a process flow diagram which illustrates a method of coping with a client side failure from the point-of-view of an agent which may be suspended for a period of time in accordance with an embodiment of the present invention.

With reference to FIG. 5A, a method of dealing with a suspended call from the point-of-view of an agent which may be suspended for a period of time will be described in accordance with an embodiment of the present invention. A process 500 of dealing with a suspended call begins at step 504 in which an agent receives notification of a suspend mode relative to a first caller. That is, the agent receives notification from a call center server that a call in which the agent was participating has been suspended.

Upon receiving notification of the suspend mode, the agent effectively suspends itself from accepting calls from queued callers in step 508, e.g., the agent does not attempt to service any other callers for a period of time. When the agent suspends itself, the agent may store information about the suspended call with the first caller. The stored information may include, but is not limited to, information about the first caller, notes made during the call with the first caller, and statistics about the call.

A determination is made in step 512 as to whether the suspension time, or the amount of time the agent suspends itself from attempting to service other callers, has elapsed. If the determination is that the suspension time has elapsed, the indication is that the agent may accept calls from substantially any caller. As such, in step 516, the agent accepts a call from a queued caller. It should be appreciated that the queued caller may be the first caller. Accepting a call generally includes being connected to the queued caller such that communications may occur. Once the call is accepted, the process of dealing with a suspended call is completed.

Alternatively, if it is determined in step 512 that the suspension time has not elapsed, process flow moves to step 520 in which it is determined if notification of a reconnection of the first caller is received. In other words, a determination is made in step 520 as to whether the first caller has established contact with a call center server. If it is determined that the first caller has not reconnected, process flow returns to step 512 and the determination of whether the suspension time has elapsed. On the other hand, if it is determined that the first caller has reconnected, the agent connects with the first caller in step 524, and the process of dealing with a suspended call is completed. When the agent connects with the first caller, the agent is allowed to effectively resume the previously suspended call.

Figure 5B:
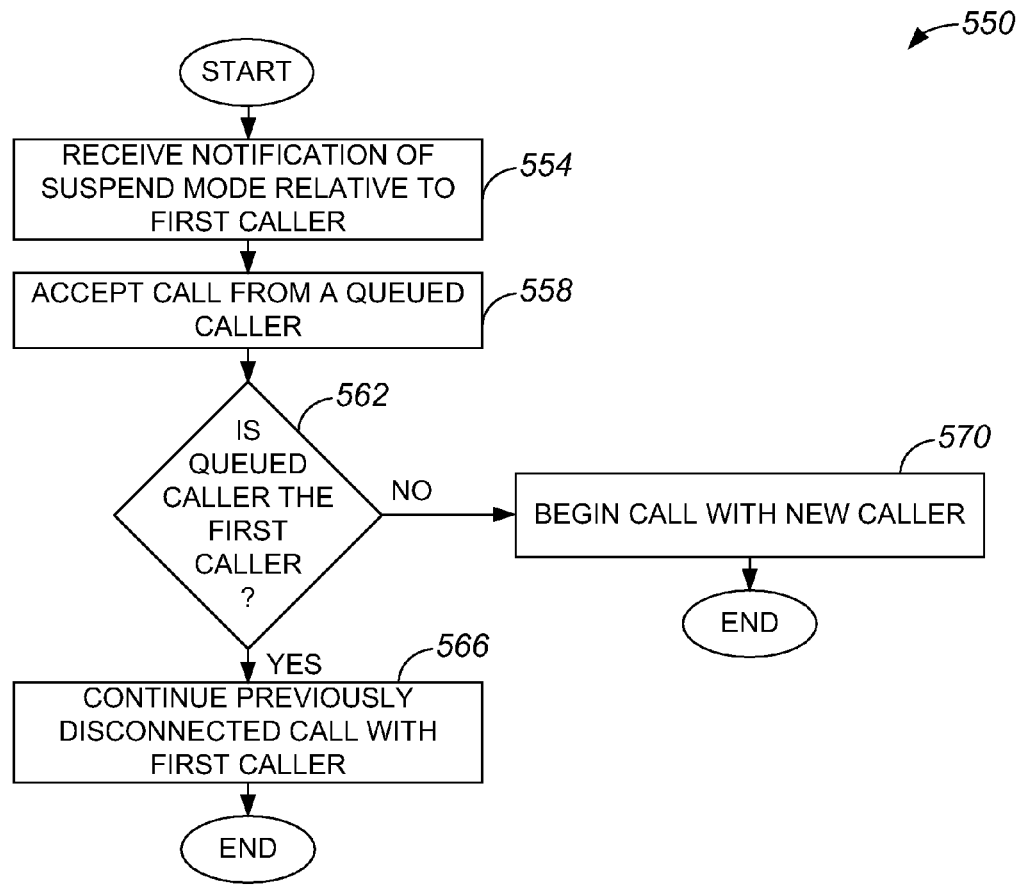
FIG. 5B is a process flow diagram which illustrates a method of coping with a client side failure from the point-of-view of an agent which is not suspended for a period of time in accordance with an embodiment of the present invention.

FIG. 5B is a method of dealing with a suspended call from the point-of-view of an agent which may is not suspended for a period of time in accordance with an embodiment of the present invention. A process 550 of dealing with a suspended call begins at step 554 in which an agent receives notification that a call between the agent and a first caller has been prematurely disconnected and, hence, suspended. Once the notification is received, the agent may accept a call from a queued caller in step 558. The queued caller is typically a caller in a queue associated with the agent or, more generally, the call center that is slated to be the next caller to receive service. Accepting a call typically from the queued caller includes being connected to the queued caller.

After the agent accepts the call, it is determined in step 562 whether the queued caller is the first caller, or the caller associated with the suspended call. If it is determined that the queued caller is the first caller, then in step 566, the agent continues the suspended or previously disconnected call with the first caller. As the agent was previously connected to the first caller, the agent is already familiar with the problem the first caller would like to resolve and likely has maintained information pertaining to the first caller. Once the agent and the first caller continue the previously suspended call, the process of dealing with a suspended call is completed.

Returning to step 562, if the determination is that the queued caller is not the first caller, then the queued caller is a new caller. As such, the agent begins a new call with the new caller in step 570, and the process of dealing with a suspended call is completed.

Figure 6A:
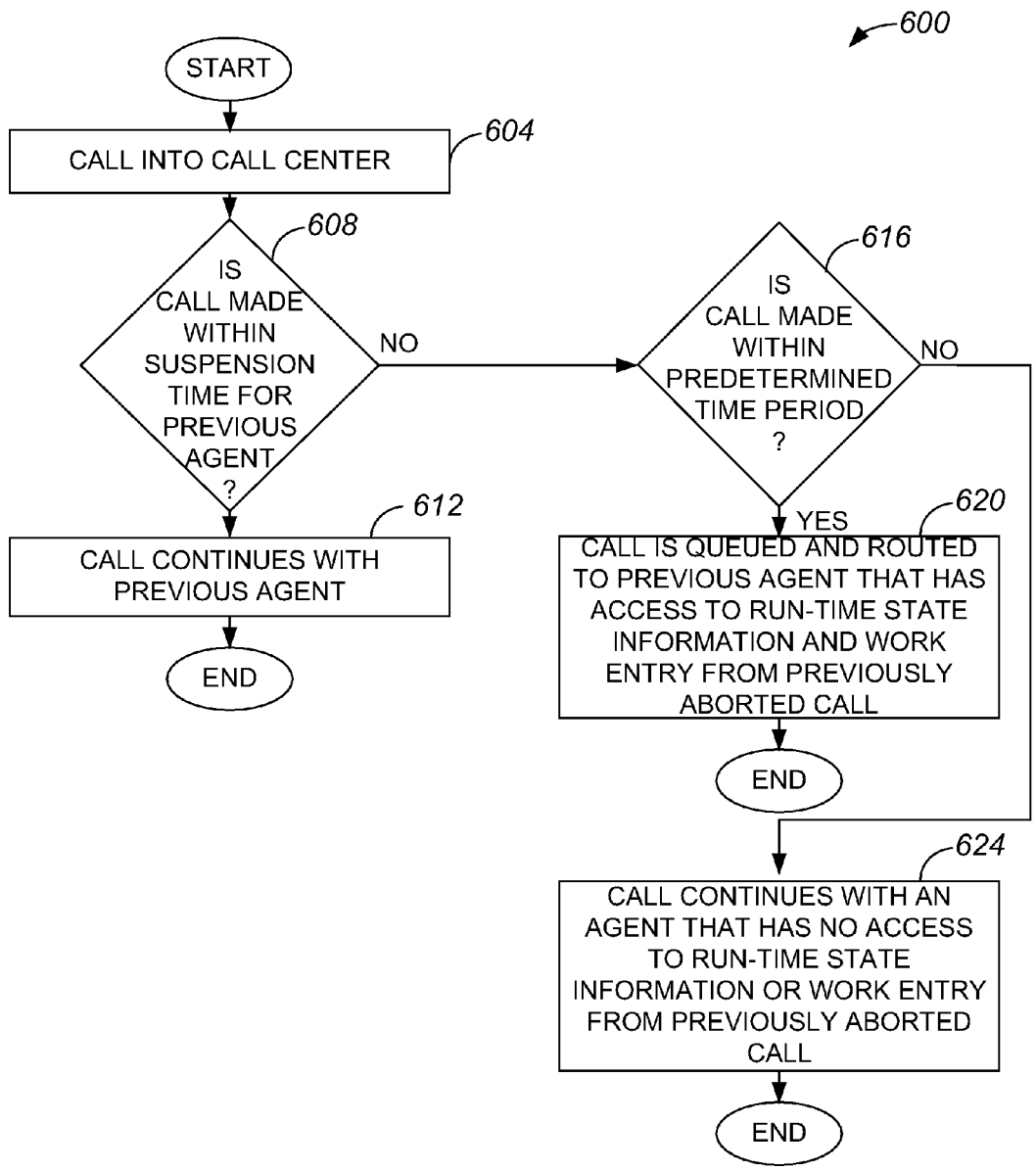
FIG. 6A is a process flow diagram which illustrates a method of a caller reconnecting to a call center after losing a connection to an agent that may be suspended for a period of time in accordance with an embodiment of the present invention.

When a call between a caller and an agent associated with a call center is prematurely terminated, the caller may call into the call center again, as previously mentioned. Depending upon how much time has elapsed between the previous termination of the call involving the caller, and the time at which the caller once again calls the call center, the caller may receive different types of treatment. The type of treatment afforded the caller is also dependent upon whether the call center is arranged to suspend agents. FIG. 6A is a process flow diagram which illustrates a method of a caller reconnecting to a call center after losing a connection to an agent that may be suspended for a period of time in accordance with an embodiment of the present invention. A process 600 of accessing a call center for service after a connection is lost begins at step 604 in which a caller calls into the call center. A determination is made in step 608 as to whether the call is made within a suspension time of the agent to which the caller was previously disconnected. If the call is made within the suspension time of the previous agent, the caller is connected back to the previous agent, and the call continues in step 612.

Once the caller and the agent are back in communication, the accessing of a call center for service is completed.

Alternatively, if the call is not made within the suspension time of the previous agent, a determination is made in step 616 as to whether the call is made within a predetermined time period. As previously mentioned, a predetermined time period may be an amount of time after the first caller and the previous agent are disconnected during which the call made in step 604 may receive priority processing. If the call is determined not to be made within the predetermined time period, then process flow proceeds to step 624 in which the call continues with an agent that does not have access to run-time state information or a work entry from the previously disconnected call. It should be appreciated that the agent that does not have access to run-time state information may be substantially any agent associated with the call center. After the call continues, the accessing of a call center for service is completed.

On the other hand, if the call is determined in step 616 as having been made within the predetermined time period, the implication is that the call is to be processed using priority processing. Accordingly, in step 620, the call is queued, e.g., at the beginning of a service queue, and routed to the previous agent. The previous agent has access to run-time state information that was generated during a previous call, as well as access to a work entry that the previous agent may have been in the process of updating when the previous call was prematurely terminated. Once the call is queued and subsequently routed to the previous agent, the accessing of a call center for service is completed.

Figure 6B:
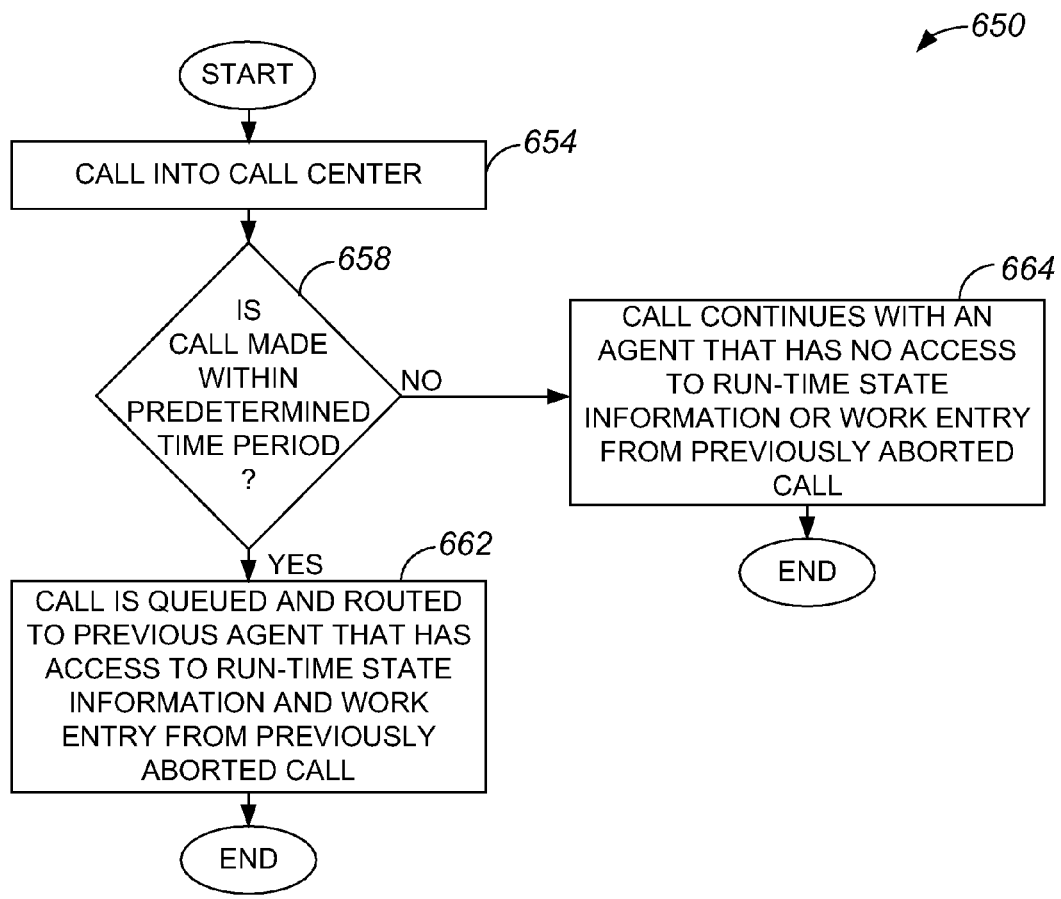
FIG. 6B is a process flow diagram which illustrates one method of a caller reconnecting to a call center after losing a connection to an agent that is not suspended for a period of time in accordance with an embodiment of the present invention.

FIG. 6B is a process flow diagram which illustrates one method of a caller reconnecting to a call center after losing a connection to an agent that is not suspended for a period of time in accordance with an embodiment of the present invention. A process 650 of accessing a call center begins at step 654 in which a caller that was previously disconnected from an agent, e.g., a previous agent, call into the call center. A determination is made in step 658 as to whether the call is made within a predetermined time period. If the call is made within the predetermined time period, the call is queued in step 662 and routed to the previous agent. The previous agent has access to run-time state information that was generated during a previous call, and access to a work entry that associated with the previous call. After the call is queued and routed to the previous agent, the accessing of a call center for service is completed.

Figure 7:
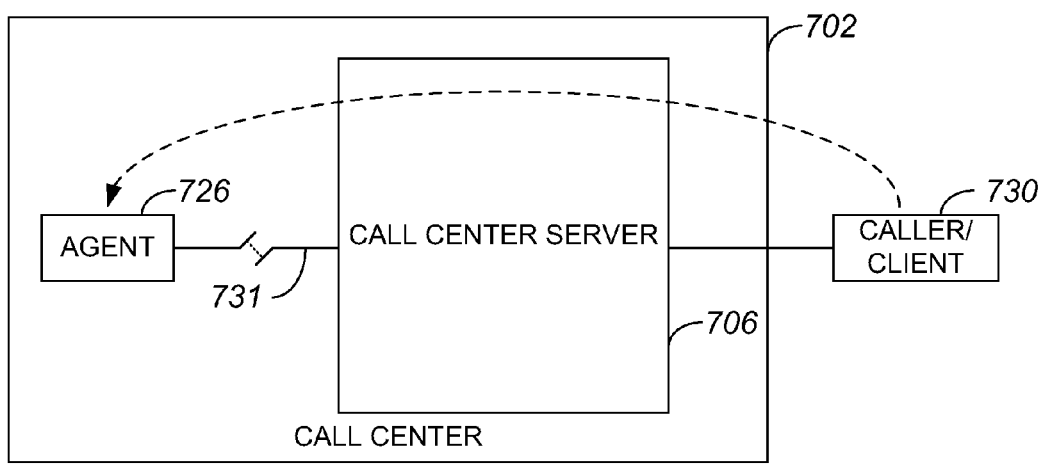
FIG. 7 is a block diagram representation of a caller re-establishing a connection to an agent after a call center side failure in accordance with an embodiment of the present invention.

While a caller side fault has been described as causing communication between a caller and an agent to be lost, a call center side fault may also cause communication between the caller and the agent to be lost. The caller may effectively re-establish a connection to the agent when informed by a call center server that the caller side fault has been remedied. FIG. 7 is a block diagram representation of a caller re-establishing a connection to an agent after a call center side failure in accordance with an embodiment of the present invention. A call center side failure may generally be a failure within a call center 702 that causes an agent 726 to lose contact with a call center server 706. Although the failure is indicated as a failure of a connection 751 between agent 726 and call center server 706, it should be appreciated that the failure may instead be associated with either agent 726 or call center server 706.

Because of the failure of connection 751, or a failure associated with call center 702 in general, communication between a caller 730 and agent 726 is lost. In one embodiment, call center server 706, upon detecting the failure, may place caller 730 on hold until the failure is corrected. After the failure is corrected, call center server 706 may reconnect caller 730 to agent 726.

Figure 8:
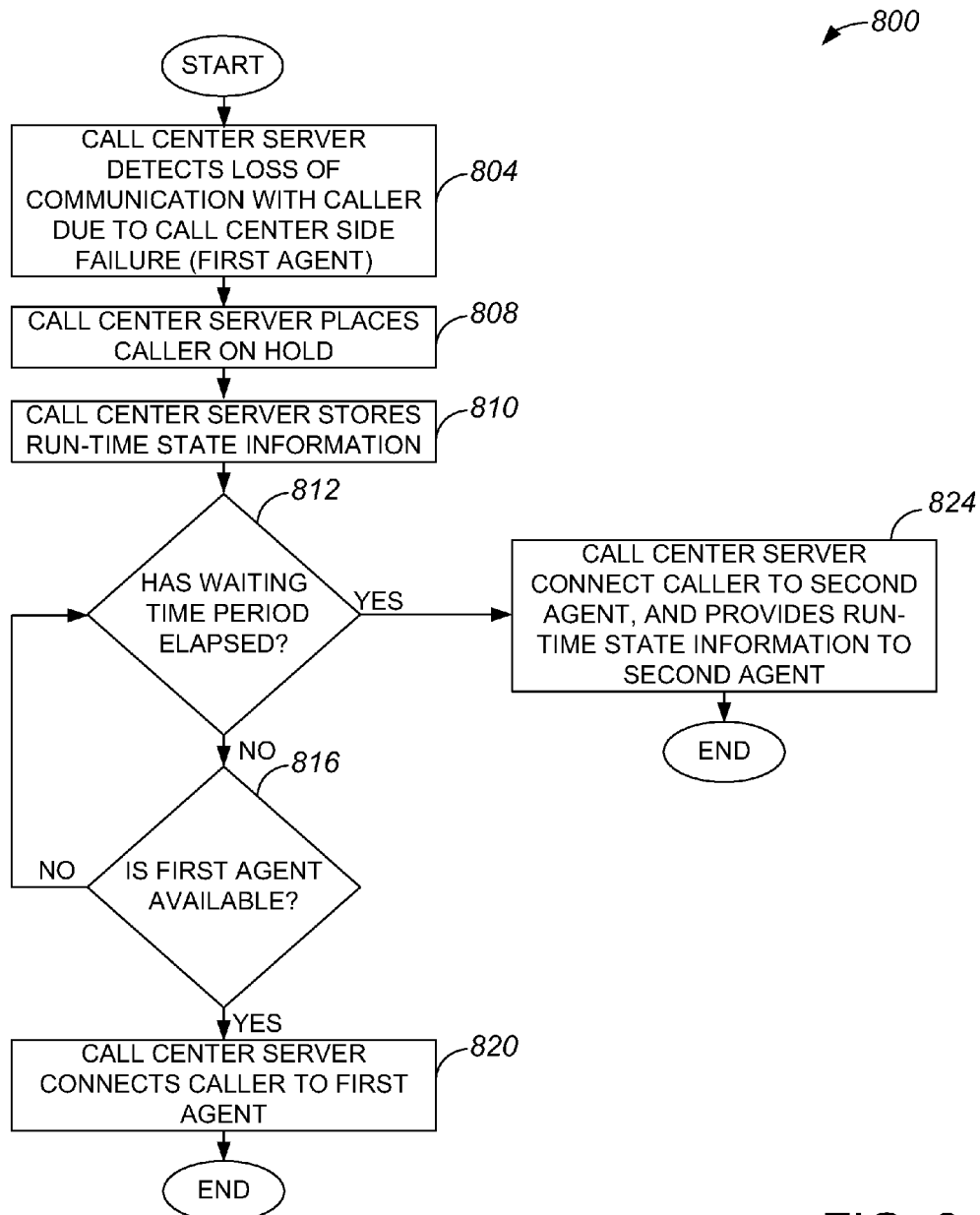
FIG. 8 is a process flow diagram which illustrates one method of processing a call center side failure that occurs during a call between a caller and an agent in accordance with an embodiment of the present invention.

With reference to FIG. 8, one method of dealing with a call center side failure that is detected during a call between a caller and an agent will be described in accordance with an embodiment of the present invention. A process 800 of dealing with a call center side failure begins at step 804 in which a call center server detects a caller side fault or failure that causes a call between a first agent and a caller to be prematurely ended. Once the call center server detects the caller side failure, the call center server places the caller on hold in step 808. Placing the caller on hold may include notifying the caller of a caller side failure, and assuring the caller that the caller side failure will be resolved shortly. In step 810, run-time state information associated with the prematurely ended call between first agent and the caller may be stored.

A determination is made in step 812 as to whether a waiting time period has elapsed. A waiting time period may be a time period during which the caller remains on hold, and waits for the caller side failure to be resolved such that communication may be re-established between the caller and the first agent. The waiting time period may vary, e.g., the waiting time period may be less than approximately one or two minutes. If it is determined that the waiting time period has elapsed, then the indication is that the caller side failure has not been resolved and, further, that communication is to be established between the caller and a different agent. As such, process flow moves to step 824 in which the caller is connected to a second agent. Connecting the caller to the second agent may include providing the run-time state information to the second agent. After the caller is connected to the second agent, the process of dealing with a caller side failure is completed.

Returning to step 812, if it is determined that the waiting time period has not elapsed, a determination is made in step 816 as to whether the first agent is available. The determination of whether the first agent is available may include determining if the caller side failure detected in step 804 has been corrected. If it is determined that the first agent is not available, process flow returns to step 812 and the determination of whether the waiting time period has elapsed. Alternatively, if it is determined in step 816 that the first agent is available, then communication between the caller and the first agent is re-established in step 820, and the process of dealing with a call center side failure is completed.

Although only a few embodiments of the present invention have been described, it should be understood that the present invention may be embodied in many other specific forms without departing from the spirit or the scope of the present invention. By way of example, a call center may include both queue groups that are specific to agents, as well as general queues that are not specific to any agent. When a caller receives priority service, the caller may be assigned to a queue group for the agent to which the caller was previously connected. If the time period during which a caller receives priority service has elapsed, the run-time state information associated with the caller may no longer be available within a call center. Hence, as it may not be possible to identify the agent to whom the caller was previously connected, the caller may be assigned to either a general queue or a queue group associated with a random agent, e.g., an agent that has a relatively short queue. For instance, with reference to FIGS. 3A and 3B, the queue of step 340 may be a general queue or a queue associated with a random agent, while the queue of step 337 may be a queue that is specific to the agent without departing from the spirit or the scope of the present invention. Alternatively, the queue of step 340 and the queue of step 337 may be the same queue.

In one embodiment, a caller who has called into a call center after run-time state information associated may remember the identity of the agent with which the caller was previously connected. Hence, even if the run-time state information associated with the previous call between the agent and the caller may no longer be available, if the caller may identify the agent, the caller may still be connected to the agent.

An agent, in one embodiment, is a system that includes a service apparatus and an individual who operates the service apparatus. When an agent and a caller are in communication, the individual may communicate with the caller and enter information, e.g., information that is relevant to a work flow entry, into the service apparatus. The service apparatus may be a computing system that includes a processor and a memory, as well as input and display devices. While the agent may also include a telephone, it should be appreciated that telephone services may be provided to the agent through the service apparatus, e.g., as a voice over Internet protocol (VoIP) application. In lieu of being a computing system, the service apparatus may instead be a terminal which allows the individual to make entries into a memory of a call center server.

Routing a caller to an agent generally involves associating the caller with an agent such that a connection may be made between the caller and the agent. Connecting a caller to an agent may include effectively opening a communications channel between the caller and the agent through which communications may occur. Assigning a caller to a queue may entail placing an identifier for the caller in a memory that stores an essentially ordered list of callers. Callers may be serviced in an order determined by the queue.

It should be understood that although a second call is generally described as being made by a caller after a first call is disconnected, as the first call may be suspended, the second call may be considered to be a resumption of the first call. That is, although a caller may make a second call into a call center after a first call with an agent has been placed in a suspend mode, if the caller succeeds in re-establishing contact or recovering communication with the agent, the re-established contact may be considered to be a continuation of the first call. Alternatively, the re-established contact between the caller and the agent may be regarded as the second call.

As previously mentioned, run-time state information may be stored substantially when the run-time state information is obtained. If the run-time state information is stored when the run-time state information is obtained, it may not be necessary to store the run-time state information when a failure occurs, as the run-time state information has already been obtained. By storing the run-time state information when it is obtained, in case the call center server crashes, the run-time state information is available. That is, as it may not be possible to store run-time state information when a failure occurs, the storage of run-time state information when the run-time state information is obtained may effectively ensure that the run-time state information is available.

The steps associated with the methods of the present invention may vary widely. Steps may be added, removed, altered, combined, and reordered without departing from the spirit of the scope of the present invention. For instance, once a suspension time for an agent has elapsed, or the agent accepts a call from a queued caller, any information that is stored as a result of a suspend mode may be erased. Therefore, the present examples are to be considered as illustrative and not restrictive, and the invention is not to be limited to the details given herein, but may be modified within the scope of the appended claims.

What is claimed is:

1. A method comprising:
   detecting termination of a first connection between a first caller and a first agent during a communication session between the first caller and the first agent, wherein detecting termination of the first connection includes identifying a lack of a stored work entry associated with the communication session;
   storing information indicating a state of the communication session at the termination of the first connection, wherein the information indicating the state of the communication session is arranged to identify the first caller and the first agent as being associated with the first connection; and
   communicating the information to the first agent or to a second agent in response to establishment of a second connection between the first caller and the first agent or the second agent to facilitate a continuation of the communication session.

2. The method of claim 1 further including:
   placing the first agent in a suspend mode if termination of the first connection is detected, wherein placing the first agent in the suspend mode includes preventing the first agent from being connected to a second caller and generating a record which indicates that the termination of the first connection was premature, the second caller being associated with a queue of callers.

3. A method comprising:
   detecting termination of a first connection between a first caller and a first agent during a communication session between the first caller and the first agent;
   storing information indicating a state of the communication session at the termination of the first connection;
   placing the first agent in a suspend mode if termination of the first connection is detected, wherein placing the first agent in the suspend mode includes preventing the first agent from being connected to a second caller and generating a record which indicates that the termination of the first connection was premature, the second caller being associated with a queue of callers;
   receiving a second call from the first caller;
   identifying the first agent using the information indicating the state of the communication session;
   determining if the first agent is in the suspend mode;
   establishing the second connection between the first caller and the first agent if it is determined that the first agent is in the suspend mode; and
   communicating the information to the first agent or to a second agent in response to establishment of a second connection between the first caller and the first agent or the second agent to facilitate a continuation of the communication session.

4. The method of claim 3 further including:
   determining whether a predetermined amount of time has elapsed between the second call and a first call associated with the first connection, wherein the first agent is identified using the information indicating the state of the communication session if the predetermined amount of time has not elapsed; and
   assigning the first caller to a beginning of the queue of callers if the predetermined amount of time has not elapsed and if the first agent is not in the suspend mode.

5. The method of claim 1 further including:
   allowing the first agent to be connected to a second caller if the termination of the first connection is detected, the second caller being associated with a queue of callers.

6. The method of claim 5 wherein the queue of callers is associated with the first agent, the method further including:
   receiving a second call from the first caller;
   identifying the first agent using the information indicating the state of the communication session; and
   assigning the first caller to a beginning of the queue of callers.

7. The method of claim 6 further including:
   determining whether a predetermined amount of time has elapsed between the second call and the first call, wherein the first agent is identified using the information indicating the state of the communication session if the predetermined amount of time has not elapsed.

8. The method of claim 1 wherein the termination of the first connection is caused by one selected from the group including a failure of a link between the first caller and the first agent, a failure associated with the first agent, and a failure associated with the first caller.

9. An apparatus comprising:
   means for detecting termination of a first connection between a first caller and a first agent during a communication session between the first caller and the first agent, wherein the means for detecting termination of the first connection include means for identifying a lack of a stored work entry associated with the communication session;
   means for storing information indicating a state of the communication session at the termination of the first connection;
   means for communicating the information to the first agent or to a second agent in response to establishment of a second connection between the first caller and the first agent or the second agent to facilitate a continuation of the communication session; and
   means for placing the first agent in a suspend mode if termination of the first connection is detected, wherein the means for placing the first agent in the suspend mode include means for generating a record which indicates that the termination of the first connection was premature.

10. The apparatus of claim 9 wherein the means for placing the first agent in the suspend mode further include means for preventing the first agent from being connected to a second caller, the second caller being associated with a queue of callers.

11. The apparatus of claim 9 further including:
    means for determining whether to place the first agent in the suspend mode or to connect the first agent to a second caller if the termination of the first connection is detected; and
    means for allowing the first agent to be connected to the second caller if the termination of the first connection is detected and if it is determined that the first agent is to be connected to the second caller, the second caller being associated with a queue of callers.

12. The apparatus of claim 9 wherein the termination of the first connection is caused by one selected from the group including a failure of a link between the first caller and the first agent, a failure associated with the first agent, and a failure associated with the first caller.

13. An apparatus comprising:
    at least a first agent; and
    a server arrangement, the server arrangement being arranged to cause a first caller to be in a communication session with the first agent, the server arrangement further being arranged to detect termination of a first connection between the first caller and the first agent and to store information indicating a state of the communication session at the termination of the first connection, wherein the information indicating the state of the communication session is arranged to identify the first caller and the first agent as being associated with the first connection, the server arrangement still further being arranged to communicate the information to the first agent or to a second agent in response to establishment of a second connection between the first caller and the first agent or the second agent to facilitate a continuation of the communication session, wherein the server arrangement is arranged to detect the termination of the first connection by identifying a lack of a stored work entry associated with the communication session.

14. The apparatus of claim 13 wherein the server arrangement is further arranged to prevent the first agent from being connected to a second caller associated with a queue of callers.

15. An apparatus comprising:
at least a first agent; and
a server arrangement, the server arrangement being arranged to cause a first caller to be in a communication session with the first agent, the server arrangement further being arranged to detect termination of a first connection between the first caller and the first agent and to store information indicating a state of the communication session at the termination of the first connection, the server arrangement still further being arranged to communicate the information to the first agent or to a second agent in response to establishment of a second connection between the first caller and the first agent or the second agent to facilitate a continuation of the communication session, wherein the server arrangement is further arranged to prevent the first agent from being connected to a second caller associated with a queue of callers, to receive a call from the first caller, and to identify the first agent using the information, and wherein the server arrangement is arranged to establish the second connection between the first caller and the first agent.

16. The apparatus of claim 13 wherein the server arrangement is further arranged to receive a call from the first caller and to identify the first agent using the information, and wherein the server arrangement is arranged to assign the first caller to a beginning of the queue of callers.

17. The apparatus of claim 13 wherein the server arrangement is further arranged to detect if the termination is caused by a failure associated with a link between the first caller and the first agent, the first caller, or the first agent.

18. The apparatus of claim 17 wherein the server arrangement is still further arranged to determine when the failure is corrected and to use the information to establish the second connection when the failure is corrected.

19. An apparatus comprising:
a memory; and
a processing arrangement, the processing arranged to detect termination of a first connection between a first endpoint and a second endpoint, wherein the processing arrangement is arranged to store information indicating a state of the communication session in the memory if the processing arrangement detects the termination of the first connection between the first endpoint and the second endpoint, the information including run-time state information that includes identifying information for the first endpoint and identifying information for the second endpoint, the processing arrangement still further being arranged to communicate the information to the second endpoint or to a third endpoint in response to establishment of a second connection between the first endpoint and the second endpoint or the third endpoint to facilitate a continuation of the communication session.

20. The apparatus of claim 19 wherein the termination of the first connection is caused by one selected from the group including a failure of a link between the first endpoint and the second endpoint, a failure associated with the first endpoint, and a failure associated with the second endpoint.

21. The method of claim 1 wherein the information includes at least a serial number of a product associated with the first caller.

22. The method of claim 1 wherein identifying the lack of the stored entry includes identifying a lack of stored run-time state information.

23. The method of claim 22 wherein storing the information indicating the state of the communication session at the termination of the first connection includes storing the run-time state information at the termination of the first connection.

* * * * *